United States Patent [19]
Chiu

[11] Patent Number: 5,433,762
[45] Date of Patent: * Jul. 18, 1995

[54] FILTERED AIR MOVING APPARATUS

[75] Inventor: Bernard Chiu, Ashland, Mass.

[73] Assignee: Duracraft Corporation, Whitinsville, Mass.

[*] Notice: The portion of the term of this patent subsequent to Jun. 6, 2012 has been disclaimed.

[21] Appl. No.: 277,811

[22] Filed: Jul. 20, 1994

Related U.S. Application Data

[63] Continuation-in-part of Ser. No. 22,231, Feb. 25, 1993.

[51] Int. Cl.$^6$ ............................................. B01D 19/00
[52] U.S. Cl. .......................................... 55/274; 55/213; 55/467
[58] Field of Search ............... 422/122, 124, 107, 110, 422/112; 55/213, 274, 467, 470, 472, 473; 95/19, 22, 23

[56] References Cited

U.S. PATENT DOCUMENTS

| | | | |
|---|---|---|---|
| 4,162,660 | 7/1979 | Albertson | 55/274 |
| 4,191,543 | 3/1980 | Peters | 422/122 X |
| 4,411,675 | 10/1983 | de Castella | 55/473 X |
| 5,131,932 | 7/1992 | Glucksman | 55/274 |
| 5,141,706 | 8/1992 | Clark | 422/124 X |

*Primary Examiner*—Amalia L. Santiago
*Attorney, Agent, or Firm*—John E. Toupal; Harold G. Jarcho

[57] ABSTRACT

A filtered air moving device including a housing defining an air inlet, an air outlet, and an air flow path therebetween; a blower disposed in the housing and arranged to move air in the flow path from the inlet to the outlet; a multiple speed electrical motor rotatably coupled to the blower; and an air filter disposed within the housing in the air flow path. Also included is a control circuit for connecting the motor to a voltage source and including an electrical switch operable between a first condition providing rotation of the blower at a given speed and a second condition providing rotation of the blower at a predetermined speed greater than the given speed; a tubulation providing communication between a location in the air flow path downstream of the filter and a position remote therefrom; an indicator responsive to the rate of air flow through the tubulation, and a selector for varying the level of resistance to air flow provided by the tubulation.

9 Claims, 2 Drawing Sheets

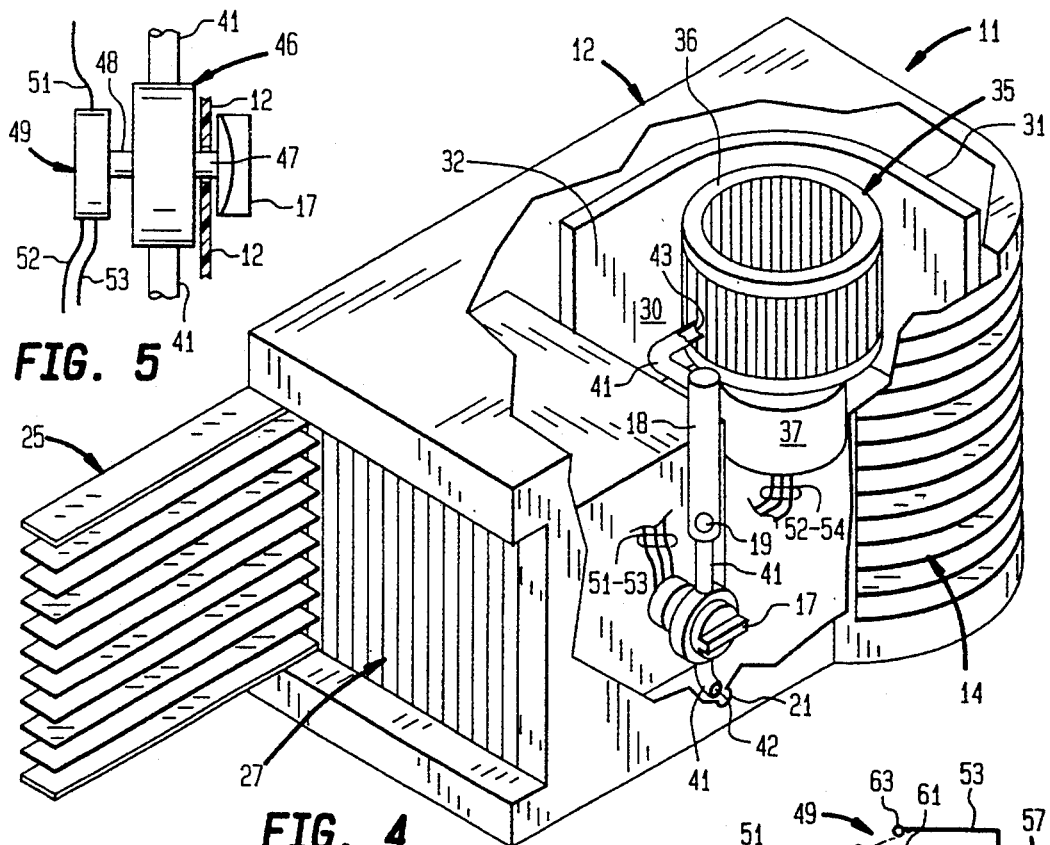
FIG. 5
FIG. 4
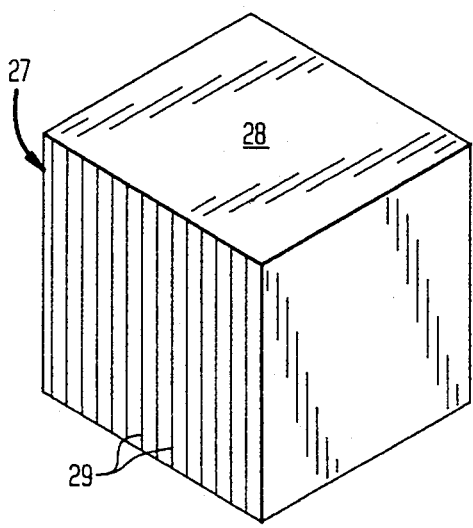
FIG. 3
FIG. 6
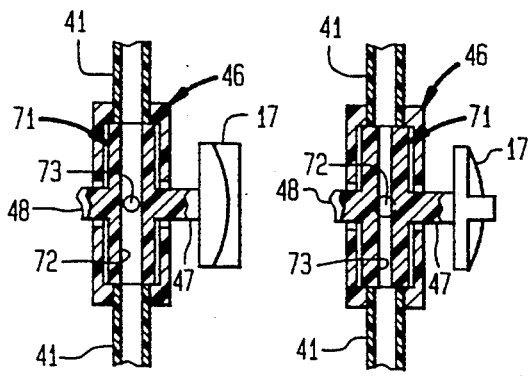
FIG. 7    FIG. 8

5,433,762

FILTERED AIR MOVING APPARATUS

This application is a Continuation-In-Part of Ser. No. 08/022,231 filed Feb. 25, 1993.

BACKGROUND OF THE INVENTION

This invention relates generally to an air cleaning device and, more particularly, to a portable air cleaning device that utilizes a replaceable filter cartridge for removing undesirable particulates from a moving stream of air.

Many air cleaning devices employ replaceable filters formed of an absorbent material that is arranged to establish a circuitous path for air flow produced by an electrically powered blower. During normal operation of such air cleaning devices, the filters progressively accumulate particles that reduce the filters permeability. Eventually, the air flow through the cleaning device becomes diminished by filter clogging to significantly reduce air cleaning efficiency. At that time, a filter must be replaced to restore efficient cleaning operation.

To assist a user in maintaining efficient cleaning operation, some air cleaning devices are equipped with indicators for monitoring the condition of a filter and indicating when it should be replaced. One such indicator consists of a transparent, vertically disposed tube having a lower end at atmospheric pressure and an upper end communicating with an internal portion of the cleaner downstream from the filter. As the filter becomes clogged with particulate matter to reduce air flow, an increased pressure drop occurs across the filter and a negative pressure is produced downstream thereof. The resultant differential pressure across the indicator tube creates an increased air flow that lifts a float member to provide an indication of a dysfunctional filter. Air cleaning devices employing filter replacement float indicators are disclosed, for example, in U.S. Pat. Nos. 3,071,914 and 5,131,932. A problem associated with float type indicators is that air flow through the indicator tube is dependent upon the magnitude of negative pressure created by the electrically operated blower. Thus, in air cleaning devices employing blowers with multiple speed motors, some form of indicator calibration is required for different blower operating speeds.

The object of this invention, therefore, is to provide an air cleaning device with an improved filter replacement indicator.

SUMMARY OF THE INVENTION

The invention is a filtered air moving device including a housing defining an air inlet, an air outlet, and an air flow path therebetween; a blower disposed in the housing and arranged to move air in the flow path from the inlet to the outlet; a multiple speed electrical motor rotatably coupled to the blower; and an air filter disposed within the housing in the air flow path. Also included is a control circuit for connecting the motor to a voltage source and including an electrical switch operable between a first condition providing rotation of the blower at a given speed and a second condition providing rotation of the blower at a predetermined speed greater than the given speed; a tubulation providing communication between a location in the air flow path downstream of the filter and a position remote therefrom; an indicator responsive to the rate of air flow through the tubulation; and a selector for varying the level of resistance to air flow provided by the tubulation. The indicator monitors the condition of the filter and variation in the resistance to air flow compensates for the effect of different blower speeds.

According to one feature, the device includes a manually operable actuator for simultaneously controlling the selector means and the condition of the electrical switch. The actuator automatically compensates rate of air flow in response to change in blower speed.

According to another feature of the invention, the actuator controls the selector to establish for the tubulation one level of resistance to air flow for the first condition of the electrical switch and another level of resistance to air flow greater than the one level for the second condition of the electrical switch means. The increased blower speed in the second switch condition is compensated by the greater air flow resistance.

According to another feature of the invention, the selector varies the minimum orifice size provided by the tubulation. Variation in minimum orifice facilitates the desired change in air flow resistance.

According to yet another feature of the invention, the tubulation includes a transparent vertical section having an upper end communicating with the location and a lower end communicating with the position, and the indicator means is a float member disposed in the transparent vertical section. A visual indication of filter condition is efficiently provided by this simple structure.

According to a further feature of the invention, the switch is a rotary switch and the selector is a rotatable valve disposed in the tubulation. Desired simultaneous control of speed and air flow is simplified by the use of rotary components.

BRIEF DESCRIPTION OF THE DRAWINGS

These and other objects and features of the invention will become more apparent upon a perusal of the following description taken in conjunction with the accompanying drawings wherein:

FIG. 3 is a perspective view of an air filter cartridge used in the device shown in FIGS. 1 and 2;

FIG. 4 is a partially cut away perspective view of the device shown in FIGS. 1 and 2;

FIG. 5 is a side view of a control assembly utilized in the device of FIGS. 1 and 2;

FIG. 6 is a schematic circuit diagram of a control circuit used in the device of FIGS. 1 and 2;

FIG. 7 is a cross-sectional view of a selector valve of the control assembly shown in FIG. 5 and shown in a one operating postion; and FIG. 8 is a cross-sectional view similar to that shown in FIG. 7 but with the selector valve in a different operating position.

DESCRIPTION OF THE PREFERRED EMBODIMENT

Figure 1:
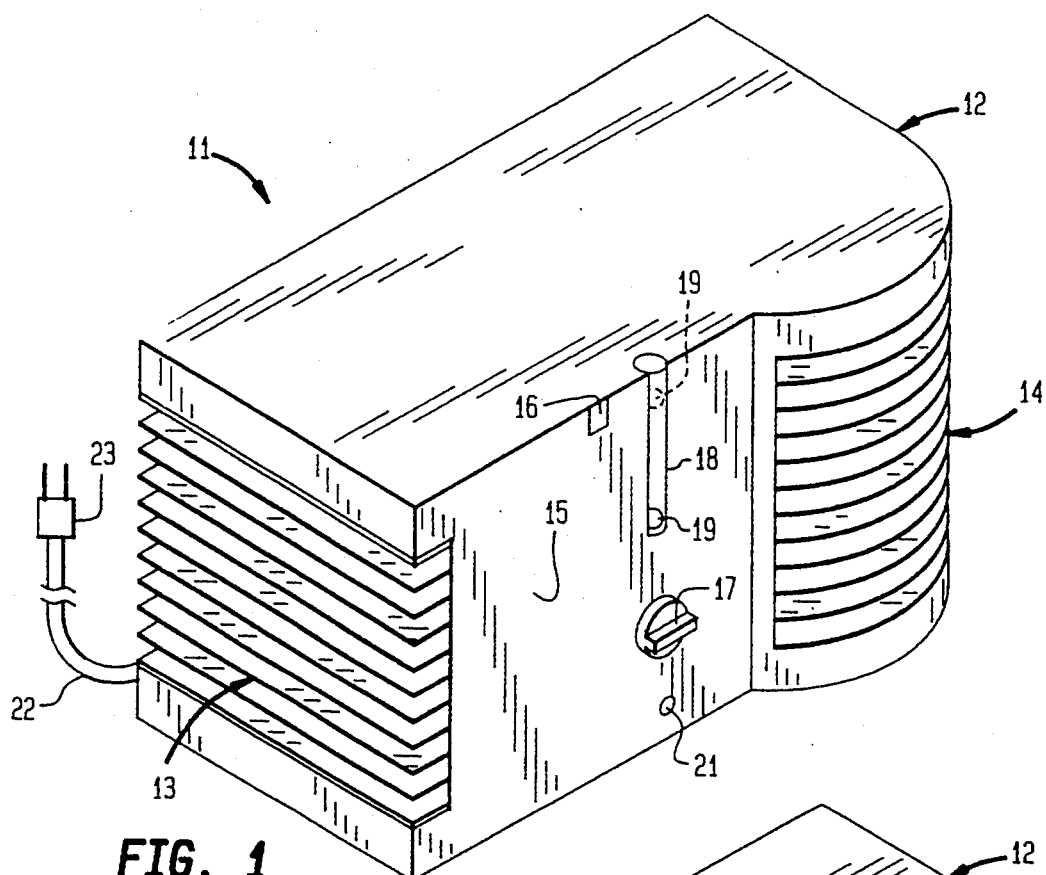
FIG. 1 is a perspective view of an air cleaning device according to the invention.
Figure 2:
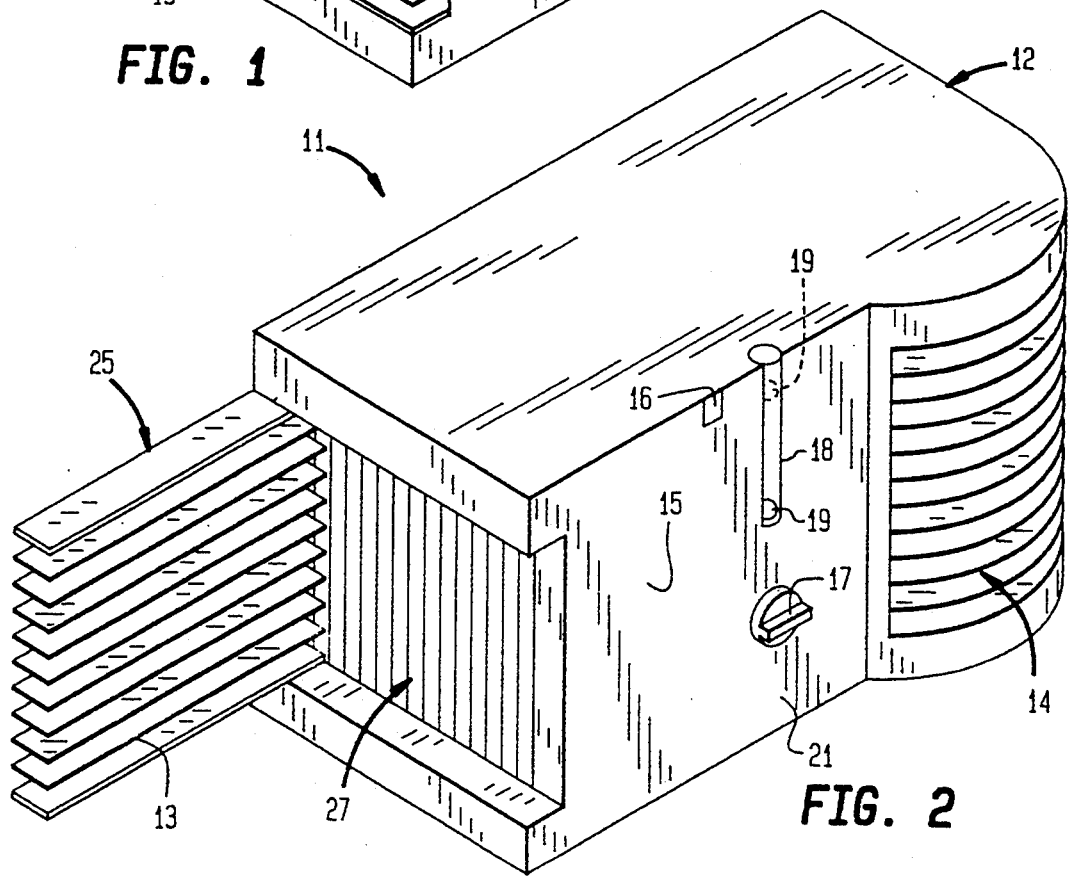
FIG. 2 is a perspective view of the device shown in FIG. 1 with an inlet door opened to provide access to an air filter cartridge.

An air cleaning device 11 includes a portable housing 12 having at one end a grill work that defines an air inlet 13 and at an opposite end a grill work that defines an air outlet 14. Disposed between the air inlet 13 and the air outlet 14 is a control panel 15 that includes a power light 16 and a manual actuator knob 17. Also included on the control panel 15 is a vertically oriented transparent viewing tube 18 retaining a float member 19. As shown in FIGS. 1, 2 and 4, the transparent cylindrical viewing tube 18 defines juxtaposed outwardly facing curved surfaces through which the float is visible. Formed by the inner and outer surfaces is a lens that magnifies the float 19 to provide for an observer a larger virtual image of the float 19 than its actual size. An atmospheric aperture 21 is formed in the control panel 15 below the actuator knob 17. Extending out of the housing 12 is an electrical cord 22 having a plug 23 for insertion into a conventional power outlet socket (not shown).

As shown in FIG. 2, a side door 25 of the housing 12 defines the inlet 13 and is hingedly attached to the housing 12 so as to be movable into an open position. In its open position, the end wall 25 provides physical access to a removable filter cartridge 27 retained within the housing 12. The filter cartridge 27 is conventional and includes an outer case 28 retaining a permeable fibrous filter material 29 that accommodates air flow while trapping particulate material entrained in that air flow.

As shown in FIG. 4, the housing 12 and an internal curved baffle 31 define an air flow path 32 extending between the air inlet 13 and the air outlet 14 and including the filter cartridge 27. Mounted in the air flow path 32 in a location 30 downstream from the filter cartridge 27 is an air moving assembly 35 consisting of a blower wheel 36 and a multiple speed motor 37 rotatably coupled thereto. Retained within the housing 12 is a tubulation 41 that includes the vertically oriented viewing tube portion 18 shown in FIGS. 1 and 2. A lower open end 42 of the tubulation 41 communicates with the atmospheric aperture 31 in the housing 12 while an upper end 43 opens into the location 30 within the housing 12 downstream from the filter cartridge 27. Mounted in the tubulation 41 between the viewing tube 18 and the lower end 42 is a rotary selector valve 46 (FIGS. 7 and 8). As shown in FIG. 5 the selector valve 46 is rotatably coupled to the actuator knob 17 (FIGS. 1 and 2) by a shaft 47. Also rotatably coupled to the selector valve 46 by a shaft 48 is a multiple contact rotary electrical switch 49 having electrical leads 51-53.

A control circuit 55 (FIG. 6) connects the rotary switch 49 between the plug 23 and windings 57 of the motor 37. The electrical switch 49 includes a movable contact 61 shown by solid lines in an open position in FIG. 6. Rotation of the switch 49 into a first operating condition moves the contact 61 into electrical engagement with a first contact 62 while rotation of the switch 49 into a second operating condition moves the movable contact 61 into electrical engagement with a second contact 63. In the first operating condition of the switch 49, voltage at the plug 23 is applied through the closed contacts 61, 62 across only a portion 66 of the motor windings 57 to produce a first low speed operational mode of the motor 37 and blower wheel 36. Conversely, in the second operating condition of the switch 49, voltage at the plug 23 is applied through the closed contacts 61, 63 across the full winding 57 to establish a second operational mode with a greater rotational speed for the motor 37 and blower wheel 36.

The selector valve 46 (FIGS. 7 and 8) includes a rotatable valve body 71 that is fixed for rotation with the shafts 47 and 48. Formed in the valve body 71 are a large orifice channel 72 and a small orifice channel 73 disposed perpendicular thereto. The large orifice channel 72 has a diameter equal to that of the tubulation 41 while the small orifice channel 73 has a substantially reduced diameter. In response to rotation of the actuator knob 17, the valve body 71 is rotated simultaneously with the rotary switch 49. With the rotary switch 49 in its first operating condition, the valve body 71 is disposed as shown in FIG. 7 with the large orifice channel 72 aligned with the tubulation 41. Conversely, with the rotary switch 49 in its second operating condition, the valve body 71 is rotated into the position shown in FIG. 8 with the small orifice channel 73 aligned with the tubulation 41 and thereby increasing therein the resistance to air flow. Thus, in the second operating condition of the switch 49 produced by the actuator knob 17, the minimum orifice of the tubulation 41 is substantially reduced by the small orifice channel 73 of the valve body 71.

OPERATION

In response to insertion of the plug 23 into a suitable ac outlet and rotation of the switch 49 into one of its operating positions, the motor 37 is energized into either its high or low speed condition. Resultant rotation of the blower wheel 36 sucks air into the air inlet 13 and through the filter cartridge 27 for centrifugal discharge through the air outlet 14. Under normal conditions, the permeability of the filter cartridge 27 produces a relatively small pressure drop across the filter cartridge 27 and creates through the tubulation 41 between its lower end 42 and its upper end 43 a rate of air flow that is insufficient to lift the float member 19 out of a first position in the viewing tube 18 shown by solid lines in FIGS. 1 and 2. However, when particle clogging has reduced the permeability of the filter cartridge 27 to a predetermined limit, an increase occurs in the pressure drop across the filter cartridge 27 and a negative pressure at the internal housing location 30. The resultant increased pressure differential between the inlet 42 and outlet 43 of the tubulation 41 produces therein an increased rate of air flow that lifts the float 19 into a second upper position shown by dotted lines in FIGS. 1 and 2 and indicating the desirability for filter replacement.

With the rotary switch 49 in its first operating condition and the motor 37 operating at low speed, the minimum orifice of the tubulation 41 including the large orifice channel 72 of the valve body 71 will create through the viewing tube 18 a rate of air flow sufficient to lift the float member 19 only after the sensed permeability of the filter cartridge 27 has reached the predetermined minimum limit. It will be noted, however, that in the absence of the selector valve 46, operation of the motor 37 in its high speed condition would increase the negative pressure within the interior housing location 30 resulting in a higher rate of air flow through the tubulation 41. Accordingly, the float 19 would rise in the viewing tube 18 even though the permeability of the filter cartridge 27 had not been reduced to the predetermined minimum replacement level. This undesirable circumstance is corrected by rotation of the selector valve body 71 into the position shown in FIG. 8 simultaneously with rotation of the switch 49 into a position to produce high speed operation of the motor 37. In the second operating condition of the valve body 71 shown in FIG. 8, the small orifice channel 73 introduces in the tubulation 41 a reduction in minimum orifice size that permits a sufficient rate of air flow to raise the float member 19 in the viewing tube 18 only when the permeability of the filter cartridge 27 has been reduced to the predetermined replacement level.

Obviously, many modifications and variations of the present invention are possible in light of the above teachings. For example, coupling arrangements other than specifically described can be used between the selector valve 46 and the switch 49. It is to be understood, therefore, that the invention can be practiced otherwise than as specifically described.

What is claimed is:

1. Filtered air moving apparatus comprising:
   housing means defining an air inlet, an air outlet, and an air flow path therebetween;
   a blower means disposed in said housing means and arranged to move air in said flow path from said inlet to said outlet;
   drive means rotatably coupled to said blower;
   air filter means disposed within said housing means in said air flow path;
   tubulation means providing fluid communication between a particular location in said air flow path and a position separate from said particular location, said tubulation means including a hollow at least partially transparent viewing section defining a curved inner surface and a curved outer surface juxtaposed thereto; and
   float means retained in said viewing section and movable therein between a first position in response to a given rate of air flow through said tubulation means and a visible second position in response to another rate of air flow through said tubulation means different than said given rate, said inner and outer surfaces forming a lens means that magnifies said float means in said second position so as to provide thereof a virtual image larger than its actual size and at least as large as it appears in said first position, and wherein said location and said position establish through said tubulation means a differential pressure that produces said second position of said float means in response to a clogged condition of said air filter means.

2. An apparatus according to claim 1 wherein said float means is also visible in said first position, and said lens means magnifies said float means in said first position so as to provide thereof a virtual image substantially equal in size to said virtual image provided in said second position.

3. An apparatus according to claim 2 wherein said viewing section is substantially vertical and has an upper end communicating with said location and a lower end communicating with said another position.

4. An apparatus according to claim 3 wherein said position is at substantially atmospheric pressure.

5. An apparatus according to claim 4 wherein said blower means is in said air flow path downstream from said filter means and said another rate of air flow is greater than said given rate of air flow.

6. An apparatus according to claim 1 wherein said viewing section is substantially vertical and has an upper end communicating with said location and a lower end communicating with said another position.

7. An apparatus according to claim 1 wherein said position is at substantially atmospheric pressure.

8. An apparatus according to claim 1 wherein said blower means is in said air flow path downstream from said filter means.

9. An apparatus according to claim 1 wherein said viewing section is a hollow cylindrical tube.

* * * * *